(12) United States Patent
Aso et al.

(10) Patent No.: US 6,534,590 B1
(45) Date of Patent: *Mar. 18, 2003

(54) SILICONE-GRAFTED VINYL COPOLYMER EMULSION COMPOSITION

(75) Inventors: Takayuki Aso, Chiba Prefecture (JP); Haruhiko Furukawa, Chiba Prefecture (JP); Yoshitsugu Morita, Chiba Prefecture (JP)

(73) Assignee: Dow Corning Toray Silicone Co., Ltd., Tokyo (JP)

(*) Notice: Subject to any disclaimer, the term of this patent is extended or adjusted under 35 U.S.C. 154(b) by 128 days.

This patent is subject to a terminal disclaimer.

(21) Appl. No.: 09/698,377

(22) Filed: Oct. 27, 2000

(30) Foreign Application Priority Data

Oct. 29, 1999 (JP) ............................................ 11-309034

(51) Int. Cl.$^7$ ............................. C09D 5/02; E08F 30/08
(52) U.S. Cl. ..................... 524/806; 526/279; 526/911; 106/287.16; 427/387
(58) Field of Search ......................... 524/806; 526/911, 526/279; 106/287.16; 427/387

(56) References Cited

U.S. PATENT DOCUMENTS 6,280,748 B1 * 8/2001 Morita ....................... 424/401

FOREIGN PATENT DOCUMENTS

| JP | Hei1-284513 | 11/1989 |
| JP | Hei5-9248 | 1/1993 |
| JP | Hei6-100634 | 4/1994 |
| JP | Hei11-1530 | 1/1999 |

\* cited by examiner

*Primary Examiner*—David W. Wu
*Assistant Examiner*—R. Harlan
(74) *Attorney, Agent, or Firm*—Duane Morris LLP

(57) ABSTRACT

The present invention provides a highly storage-stable silicone-grafted vinyl copolymer emulsion composition that can produce films and coatings that are highly water repellent, water resistant, adhesive, and printable, the composition including (A) vinyl monomer, (B) carbosiloxane dendrimer that contains a radically polymerizable organic group, (C) surfactant, and (D) radical polymerization initiator.

4 Claims, No Drawings

SILICONE-GRAFTED VINYL COPOLYMER EMULSION COMPOSITION

FIELD OF THE INVENTION

This invention relates to a silicone-grafted vinyl copolymer emulsion composition. More particularly, this invention relates to a highly storage-stable silicone-grafted vinyl copolymer emulsion composition that has the ability to form highly water-resistant coatings and films.

BACKGROUND OF THE INVENTION

Silicone-grafted vinyl copolymers have in the past been produced by solution polymerization techniques in which vinyl monomer is polymerized in organic solvent with a straight-chain silicone macromonomer bearing a radically polymerizable functional group (referred to below simply as silicone macromonomer). However, due to issues associated with the use of organic solvents, i.e., safety, toxicity, and environmental issues, there has quite recently been underway a transition to the emulsion-type products produced by emulsion polymerization technology. The corresponding silicone-grafted vinyl copolymer emulsions have generally been prepared by first emulsifying the vinyl monomer and silicone macromonomer and then adding radical polymerization initiator and effecting polymerization. Unfortunately, silicone macromonomers, being poorly diffusible within the micelle due to their high molecular weight and also being encumbered by large steric hindrance, have exhibited a low reactivity with vinyl monomers. As a consequence, large amounts of the silicone macromonomer have remained unpolymerized after termination of the reaction, which has reduced the purity of the reaction system. In addition, the unpolymerized silicone macromonomer has a low solubility in vinyl monomer and the post-polymerization polymer and as a result will bleed out onto the film surface when the silicone-grafted vinyl copolymer emulsion product is coated on substrate. This outmigration not only serves to impair the printability, the compatibility with other materials, and the adhesiveness for other substrates, but also generates a lubricity in excess of that required. Finally, higher degrees of polymerization (DP) by the silicone macromonomer increase the likelihood that aggregates or coagulates will be produced during emulsion polymerization and also cause an unsatisfactory post-polymerization emulsion stability.

To counter these problems, Japanese Patent Application Laid Open (Kokai) Number Hei 5-9248 (9,248/1993) has disclosed a method that seeks to effectively convert silicone macromonomer through the use of oil-soluble radical initiator in combination with silicone macromonomer and vinyl monomer. This notwithstanding, even with the use of this method the conversion remains unsatisfactory and unpolymerized silicone macromonomer still remains available to impair such properties as the printability and compatibility with other materials.

The acrylic emulsion composition proposed by Japanese Patent Application Laid Open (Kokai) Number Hei 1-284513 (284,513/1989) does provide a high conversion through the use of low-DP silicone macromonomer, but at the expense of rendering unsatisfactory those properties, such as water repellency, that originate with silicone.

Thus, it has been substantially impossible using prior-art silicone macromonomers to produce a high-purity, high-performance silicone-grafted vinyl copolymer emulsion that is also highly storage, stable and does not produce aggregates or coagulates.

SUMMARY OF THE INVENTION

The present inventors achieved this invention as the result of extensive investigations directed to solving the problems described above.

In specific terms, the object of this invention is to provide a highly storage-stable silicone-grafted vinyl copolymer emulsion composition that can produce a film or coating that itself is highly water repellent, water resistant, adhesive, and printable.

DETAILED DESCRIPTION OF THE INVENTION

This invention relates to silicone-grafted vinyl copolymer emulsion compositions as afforded by the emulsion polymerization of components comprising (A) vinyl monomer;
(B) carbosiloxane dendrimer that contains a radically polymerizable organic group and has the following general formula

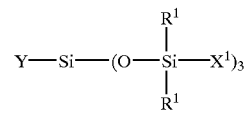

wherein Y is a radically polymerizable organic group, $R^1$ is $C_1$ to $C_{10}$ alkyl or aryl, and $X^1$ is the silylalkyl group with the following formula when i=1

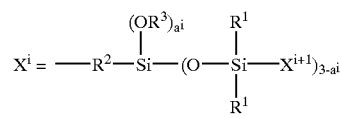

($R^1$ is defined as above; $R^2$ is $C_2$ to $C_{10}$ alkylene; $R^3$ is $C_1$ to $C_{10}$ alkyl; $X^{i+1}$ is selected from the group consisting of hydrogen, $C_1$ to $C_{10}$ alkyl, aryl, and the above-defined silylalkyl group; i is an integer with a value from 1 to 10 that specifies the generation of said silylalkyl group; and $a^i$ is an integer from 0 to 3), wherein the component (A); component (B) weight ratio is 0:100 to 99.9:0.1;

(C) surfactant, at from 0.01 to 20 weight parts for each 100 weight parts of the total of components (A) and (B); and (D) radical polymerization initiator, at from 0.01 to 20 weight parts for each 100 weight parts of the total of components (A) and (B).

DESCRIPTION OF THE PREFERRED EMBODIMENTS

Each component of the inventive composition will be explained in detail in the following.

The vinyl monomer (A) should contain a radically polymerizable vinyl group, but the type and properties of this monomer are not otherwise critical. Vinyl monomer (A) can be exemplified by lower alkyl acrylates such as methyl acrylate, ethyl acrylate, n-propyl acrylate, and isopropyl acrylate; lower alkyl methacrylates such as methyl methacrylate, ethyl methacrylate, n-propyl methacrylate, and isopropyl methacrylate; higher acrylates such as n-butyl acrylate, isobutyl acrylate, tert-butyl acrylate, n-hexyl acrylate, cyclohexyl acrylate, 2-ethylhexyl acrylate, octyl acrylate, lauryl acrylate, and stearyl acrylate; higher methacrylates such as n-butyl methacrylate, isobutyl methacrylate, tert-butyl methacrylate, n-hexyl methacrylate, cyclohexyl methacrylate, 2-ethylhexyl methacrylate, octyl methacrylate, lauryl methacrylate, and stearyl methacrylate; the vinyl esters of lower aliphatic acids, such as vinyl acetate and vinyl propionate; the vinyl esters of higher aliphatic acids, such as vinyl butyrate, vinyl caproate, vinyl 2-ethylhexanoate, vinyl laurate, and vinyl stearate; aromatic vinyl monomers such as styrene, vinyl toluene, benzyl acrylate, benzyl methacrylate, phenoxyethyl acrylate, phenoxyethyl methacrylate, and vinyl pyrrolidone; amino-functional vinyl monomers such as dimethylaminoethyl acrylate, dimethylamninoethyl methacrylate, diethylaminoethyl acrylate, and diethylaminoethyl methacrylate; amide-functional vinyl monomers such as acrylamide, N-methylolacrylamide, N-methoxymethylacrylamide, isobutoxymethoxyacrylamide, N,N-dimethylacrylamide, methacrylamide, N-methylolmethacrylamide, N-methoxymethylmethacrylamide, isobutoxymethoxymethacrylamide, and N,N-dimethylmethacrylamide; hydroxyl-functional vinyl monomers such as 2-hydroxyethyl acrylate, 2-hydroxybutyl acrylate, 2-hydroxypropyl acrylate, 2-hydroxyethyl methacrylate, 2-hydroxybutyl methacrylate, and 2-hydroxypropyl methacrylate; fluorinated vinyl monomers such as trifluoropropyl acrylate, perfluorobutylethyl acrylate, perfluorooctylethyl acrylate, trifluoropropyl methacrylate, perfluorobutylethyl methacrylate, and perfluorooctylethyl methacrylate; epoxy-functional vinyl monomers such as glycidyl acrylate, 3,4-epoxycyclohexylmethyl acrylate, glycidyl methacrylate, and 3,4-epoxycyclohexylmethyl methacrylate; ether linkage-containing vinyl monomers such as tetrahydrofurfuryl acrylate, butoxyethyl acrylate, ethoxydiethylene glycol acrylate, polyethylene glycol acrylate, polypropylene glycol monoacrylate, hydroxybutyl vinyl ether, cetyl vinyl ether, 2-ethylhexyl vinyl ether, tetrahydrofurfuryl methacrylate, butoxyethyl methacrylate, ethoxydiethylene glycol methacrylate, polyethylene glycol methacrylate, polypropylene glycol monomethacrylate; alkoxysilanes that contain a radically polymerizable unsaturated group, such as $CH_2=CHCOOC_3H_6Si(OCH_3)_3$,
$CH_2=C(CH_3)COOC_3H_6Si(OCH_3)_3$,
$CH_2=C(CH_3)COOC_3H_6Si(CH_3)(OCH_3)_2$,
$CH_2=C(CH_3)COOC_3H_6Si(CH_3)_2OCH_3$,
$CH_2=C(CH_3)COOC_2H_4OC_3H_6Si(OCH_3)_3$,
$CH_2=C(CH_3)COOC_{12}H_{24}Si(OCH_3)_3$,
$CH_2=CHOC_3H_6Si(CH_3)(OC_2H_5)_2$,
$CH_2=CHSi(OCH_3)_3$,
$CH_2=CHSi(OC_2H_5)_3$, and
$CH_2=CHSi(C_4H_9)(OC_4H_9)_2$;

unsaturated group-functionalized silicone compounds such as organopolysiloxane (branched or straight-chain) bearing an acryl or methacryl group at a single terminal and polydimethylsiloxane bearing a styryl group at a single terminal; butadiene; vinyl chloride; vinylidene chloride; acrylonitrile and methacrylonitrile; dibutyl fumarate; maleic anhydride; dodecylsuccinic anhydride; radically polymerizable unsaturated carboxylic acids, such as acrylic acid, methacrylic acid, itaconic acid, crotonic acid, fumaric acid, and maleic acid, as well as their alkali metal salts, ammonium salts, and organic amine salts; radically polymerizable unsaturated monomers that contain a sulfonic acid residue, e.g., styrenesulfonic acid, as well as their alkali metal salts, ammonium salts, and organic amine salts; quaternary ammonium salts that are derived from (meth)acrylic acid, such as 2-hydroxy-3-methacryloxypropyltrimethylammonium chloride; and the methacrylate esters of alcohols that contain a tertiary amine group, such as the diethylamine ester of methacrylic acid, as well as the quaternary ammonium salts thereof. Preferred among the preceding are acrylate ester monomers, methacrylate ester monomers, and styrene monomers.

Also usable are multifunctional vinyl monomers, as can be exemplified by acryloyl- or methacryloyl-functional monomers such as trimethylolpropane triacrylate, pentaerythritol triacrylate, ethylene glycol diacrylate, tetraethylene glycol diacrylate, polyethylene glycol diacrylate, 1,4-butanediol diacrylate, 1,6-hexanediol diacrylate, neopentyl glycol diacrylate, trimethylolpropane trioxyethylacrylate, tris(2-hydroxyethyl)isocyanurate diacrylate, tris(2-hydroxyethyl)isocyanurate triacrylate, trimethylolpropane trimethacrylate, pentaerythritol trimethacrylate, ethylene glycol dimethacrylate, tetraethylene glycol dimethacrylate, polyethylene glycol dimethacrylate, 1,4-butanediol dimethacrylate, 1,6-hexanediol dimethacrylate, neopentyl glycol dimethacrylate, trimethylolpropane trioxyethylmethacrylate, tris(2-hydroxyethyl)isocyanurate dimethacrylate, tris(2-hydroxyethyl)isocyanurate trimethacrylate, the diacrylates and dimethacrylates of diols that are the adducts of ethylene oxide or propylene oxide on bisphenol A, and the diacrylates and dimethacrylates of diols that are the adducts of ethylene oxide or propylene oxide on hydrogenated bisphenol A. Usable multifunctional vinyl monomers can also be exemplified by triethylene glycol divinyl ether, divinylbenzene, and unsaturated group-functional silicone compounds such as polydimethylsiloxane endblocked at both terminals by the styryl group and polydimethylsiloxane endblocked at both terminals by methacryloxypropyl.

Considering the above-listed vinyl monomers, the use in particular of vinyl monomer bearing a crosslinkable functional group makes it possible for the silicone-grafted vinyl copolymer to undergo crosslinking upon removal of the water from the composition after emulsion polymerization. The crosslinkable functional group under consideration can be, for example, an amino group, epoxy group, tetrahydrofurfuryl group, carboxyl group, hydroxyl group, blocked isocyanate group, or any of various silyl groups, e.g., halogenated silyl, alkoxysilyl, and acetoxysilyl. This crosslinking serves to improve the durability and solvent resistance of the silicone-grafted vinyl copolymer. The crosslinking can be of the self-crosslinking type or may be effected using a crosslinker, e.g., melamine, multifunctional epoxy, or multifunctional isocyanate. A crosslinking catalyst can also be used as necessary. Since in some cases the aforementioned crosslinkable functional groups can be hydrolyzed by water, it may be necessary to effect emulsification—using techniques known in the art—so as to avoid their hydrolysis. Moreover, an additional stabilization of the composition of the present invention can be achieved by using hydrophilic vinyl monomer for a portion of component (A), said hydrophilic vinyl monomer being exemplified by acrylic acid, methacrylic acid, 2-hydroxyethyl acrylate, dimethylaminoethyl acrylate, 2-hydroxyethyl methacrylate, and dimethylaminoethyl methacrylate.

The carbosiloxane dendrimer bearing a radically polymerizable organic group, designated as component (B), has the following general formula.

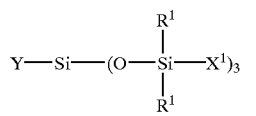

wherein Y in this general formula is a radically polymerizable organic group and can be, for example, $C_2$ to $C_{10}$ alkenyl or an acryl-, methacryl-, or styryl-functional organic group as defined by the following general formulas.

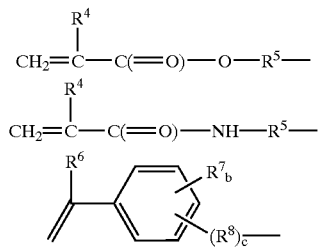

$R^4$ and $R^6$ in these formulas are hydrogen or methyl; $R^5$ and $R^8$ are $C_1$ to $C_{10}$ alkylene; $R^7$ is $C_1$ to $C_{10}$ alkyl; b is an integer from 0 to 4; and c is 0 or 1. These radically polymerizable organic groups can be exemplified by acryloxymethyl, 3-acryloxypropyl, methacryloxymethyl, 3-methacryloxypropyl, 4-vinylphenyl, 3-vinylphenyl, 4-(2-propenyl)phenyl, 3-(2-propenyl)phenyl, 2-(4-vinylphenyl)ethyl, 2-(3-vinylphenyl)ethyl, vinyl, allyl, methallyl, and 5-hexenyl. $R^1$ in the preceding general formula for the carbosiloxane dendrimer (B) is $C_1$ to $C_{10}$ alkyl or aryl. The alkyl encompassed by $R^1$ can be exemplified by methyl, ethyl, propyl, butyl, pentyl, isopropyl, isobutyl, cyclopentyl, and cyclohexyl. The aryl encompassed by $R^1$ can be exemplified by phenyl and naphthyl. Methyl and phenyl are preferred for $R^1$, and methyl is particularly preferred. $X^1$ is the silylalkyl group with the following formula when i=1:

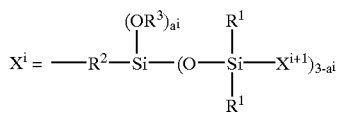

$R^1$ in the preceding formula is defined as above. $R^2$ in the preceding formula represents $C_2$ to $C_{10}$ alkylene and can be exemplified by ethylene, propylene, and butylene. $R^3$ in the preceding formula is $C_1$ to $C_{10}$ alkyl, for example, methyl, ethyl, propyl, or butyl. $X^{i+1}$ is selected from the group consisting of hydrogen, $C_1$ to $C_{10}$ alkyl, aryl, and the above-defined silylalkyl group. $a^i$ is an integer from 0 to 3. i is an integer with a value from 1 to 10 that specifies the generation of said silylalkyl group, i.e., that indicates the number of repetitions of this silylalkyl group. Thus, the carbosiloxane dendrimer (B) has the following general formula when the number of generations i is 1:

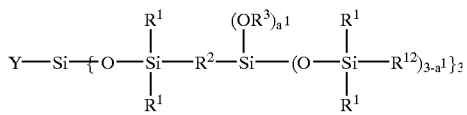

(in the preceding formula, Y, $R^1$, $R^2$, and $R^3$ are defined as above; $R^{12}$ is hydrogen or is defined as for $R^1$; $a^1$ is defined as for $a^i$; and the average of the sum of the $a^1$ values in each molecule is from 0 to 7). The carbosiloxane dendrimer (B) has the following general formula when the number of generations i is 2:

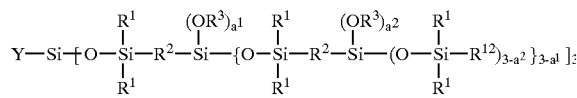

(in the preceding formula, Y, $R^1$, $R^2$, $R^3$, and $R^{12}$ are defined as above; $a^1$ and $a^2$ are defined as for $a^i$; and the average of the sum of the $a^1$ and $a^2$ values in each molecule is from 0 to 25). The carbosiloxane dendrimer (B) has the following general formula when the number of generations i is 3:

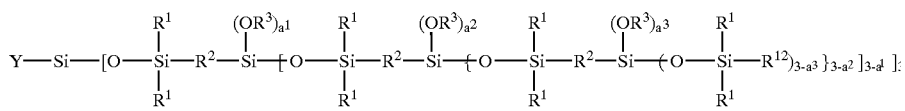

(in the preceding formula, Y, $R^1$, $R^2$, $R^3$, and $R^{12}$ are defined as above; $a^1$, $a^2$ and $a^3$ are defined as for $a^i$; and the average of the sum of the $a^1$, $a^2$, and $a^3$ values in each molecule is from 0 to 79).

Compounds with the following average compositional formulas are examples of component (B), i.e., carbosiloxane dendrimer functionalized with a radically polymerizable organic group:

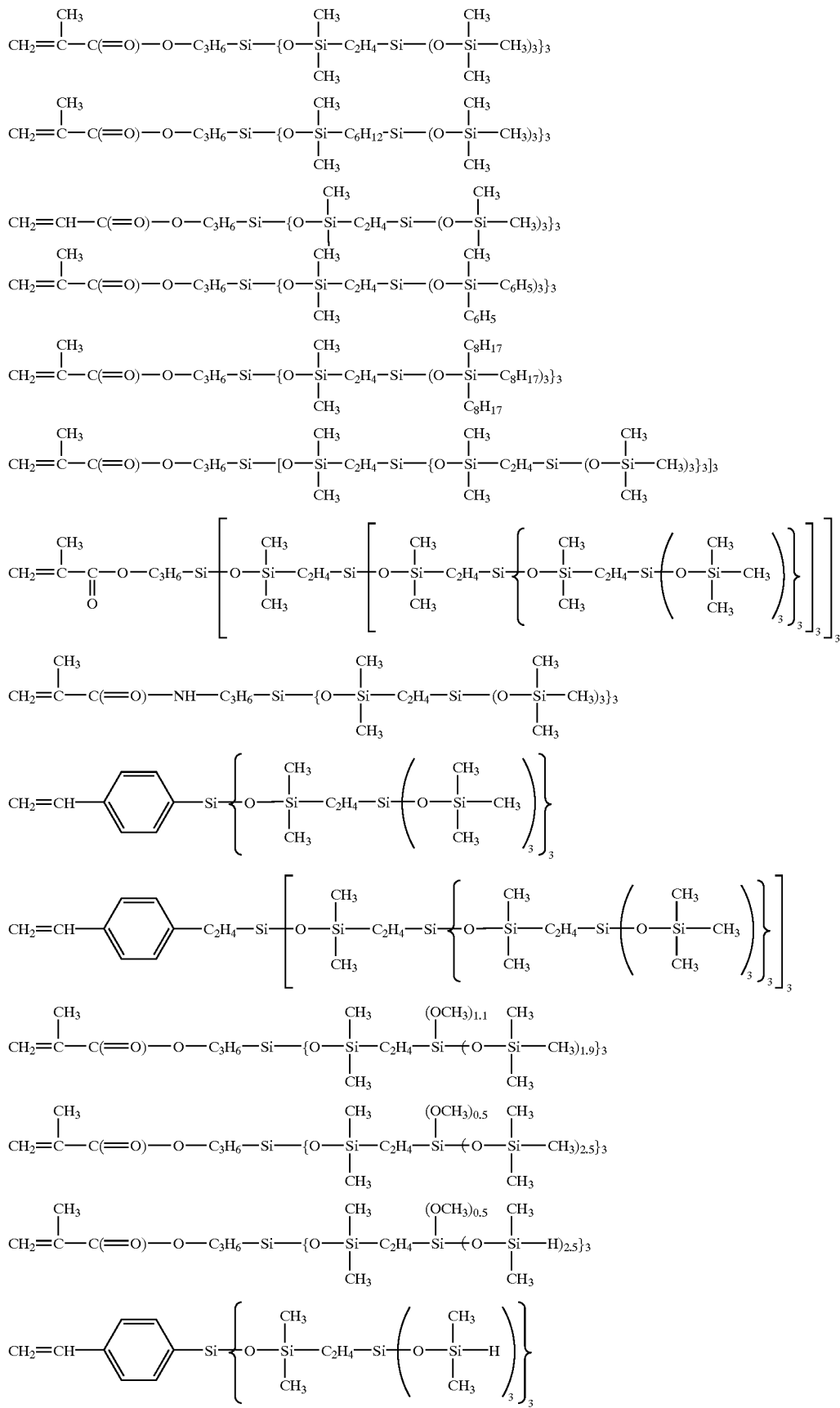

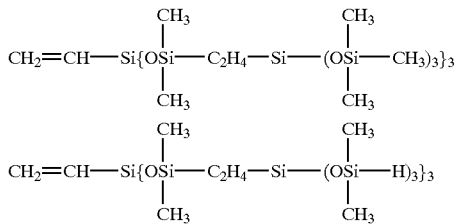

The carbosiloxane dendrimer described above can be synthesized, for example, by the method described in Japanese Patent Application Laid Open (Kokai) Number Hei 11-1530 (1,530/1999). In this method, the carbosiloxane dendrimer is synthesized by running a hydrosilylation reaction between an alkenyl-functional organosilicon compound and an SiH-functional silicon compound with the following general formula

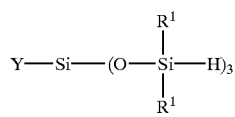

in which $R^1$ and Y are defined as above. The silicon compound with this formula can be exemplified by 3-methacryloxypropyltris(dimethylsiloxy)silane, 3-acryloxypropyltris(dimethylsiloxy)silane, and 4-vinylphenyltris(dimethylsiloxy)silane. The alkenyl-functional organosilicon compound referenced above can be exemplified by vinyltris(trimethylsiloxy)silane, vinyltris(dimethylphenylsiloxy)silane, and 5-hexenyltris(trimethylsiloxy)silane. This hydrosilylation reaction is preferably run in the presence of a transition metal catalyst, e.g., chloroplatinic acid or a platinum-vinylsiloxane complex.

The component (A): component (B) polymerization ratio should be in the range from 0:100 to 99.9:0.1 as the component (A): component (B) weight ratio and is preferably from 50:50 to 95:5 and is more preferably from 60:40 to 90:10. The characteristic properties of the carbosiloxane dendrimer structure do not appear when the component (B) blending ratio is below 0.1.

The surfactant (C) may be surfactants typically used in the emulsion-polymerization of vinyl polymers, and the choice of such is not critical. It may be e.g., an anionic surfactant, nonionic surfactant, cationic surfactant, or amphoteric surfactant. Anionic surfactants are exemplified by sodium oleate, sodium stearate, the sodium salt of dodecylbenzensulfonic acid, salts of alkylsulfate, and the sodium salt of polyoxyethylenealkylethersulfonic acid. Cationic surfactants are exemplified by quarternary ammonium salts such as dodecyltrimethylammonium hydroxide, hexadecyltrimethylammonium hydroxide, octyldimethylbenzylammonium hydroxide, decyldimethylbenzylammonium hydroxide, didodecyldimethylbenzylammonium hydroxide, dioctadecyldimethylbenzylammonium hydroxide, tallow trimethylammonium hydroxide, and coconut oil- trimethylammonium hydroxide. Nonionic surfactants are exemplified by polyoxyethylene laurylether, polyoxyethylene stearylether, polyoxyethylene nonylphenolether, polyoxyethylene monostearate, sorbitan monostearate, and polyoxyethylene sorbitan monostearate. Amphoteric surfactants are exemplified by amino acid-type surfactants and betaine-type surfactants. Anionic surfactants, cationic surfactants or combinations of these surfactants are preferred.

The surfactant (C) is more preferably a radically polymerizable surfactant which enhances the water-resistance of films formed from the emulsion composition. The radically polymerizable surfactant should exhibit surfactancy and should be capable of undergoing radical polymerization, but its character is not otherwise critical. This radically polymerizable surfactant (C) may be an anionic, nonionic, or cationic surfactant.

The anionic types of radically polymerizable surfactant (C) may be exemplified by compounds with the following structures.

Acrylic types of anionic surfactant:

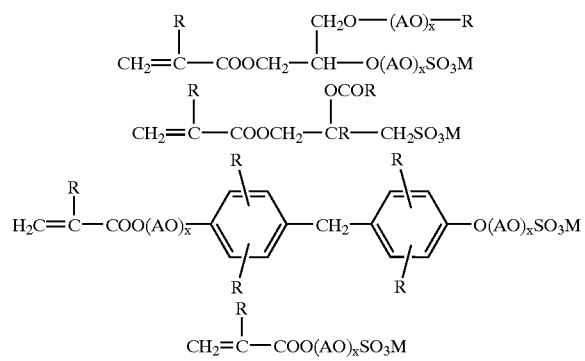

In the preceding structures, R is hydrogen or methyl, M denotes alkali metal, AO denotes alkylene oxide, and x is an integer from 1 to 50.

Allylic types of radically polymerizable anionic surfactant:

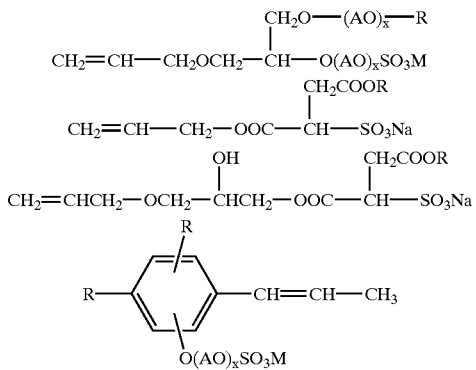

In the preceding structures, R is hydrogen or methyl, M denotes alkali metal, AO denotes alkylene oxide, and x is an integer from 1 to 50.

Maleic acid types of radically polymerizable anionic surfactant:

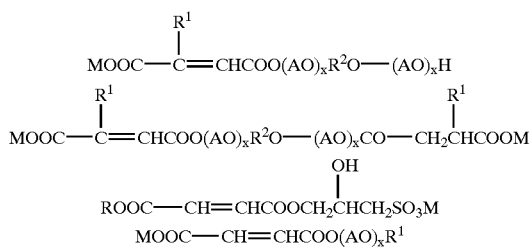

$R^1$ in the preceding structures is hydrogen or methyl, $R^2$ denotes alkylene, M denotes alkali metal, AO denotes alkylene oxide, and x is an integer from 1 to 50.

Itaconic acid types of radically polymerizable anionic surfactant:

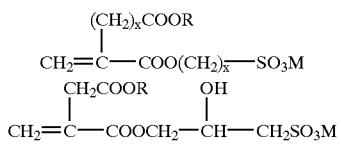

In the preceding structures, R is hydrogen or methyl, M denotes alkali metal, and x is an integer from 1 to 50.

The nonionic types of the radically polymerizable surfactant (C) can be exemplified by the following compounds.

Acrylic types of radically polymerizable nonionic surfactant:

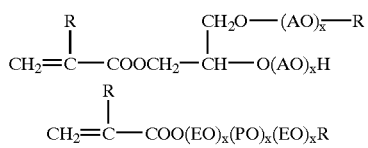

In the preceding structures, R is hydrogen or methyl, AO denotes alkylene oxide, EO denotes ethylene oxide, PO denotes propylene oxide, and x is an integer from 1 to 50.

Allylic types of radically polymerizable nonionic surfactant:

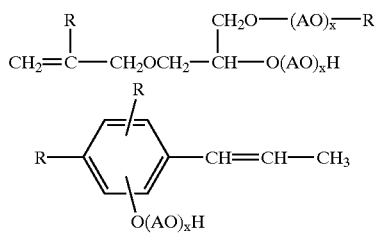

In the preceding structures, R is hydrogen or methyl, AO denotes alkylene oxide, and x is an integer from 1 to 50.

Maleic acid types of radically polymerizable nonionic surfactant:

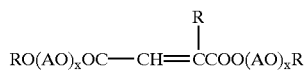

Itaconic acid types of radically polymerizable nonionic surfactant:

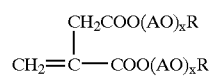

In the preceding structures, R is hydrogen or methyl, AO denotes alkylene oxide, and x is an integer from 1 to 50.

The cationic types of the radically polymerizable surfactant (C) can be exemplified by the following compounds.

Acrylic types of radically polymerizable cationic surfactant:

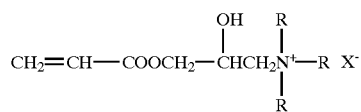

In the preceding structures, R is hydrogen or methyl, X is a halogen atom, AO denotes alkylene oxide, and x is an integer from 1 to 50.

Allylic types of radically polymerizable cationic surfactant:

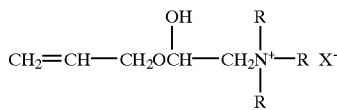

In the preceding structures, R is hydrogen or methyl, X is a halogen atom, AO denotes alkylene oxide, and x is an integer from 1 to 50.

The following surfactants are preferred from among those listed above:

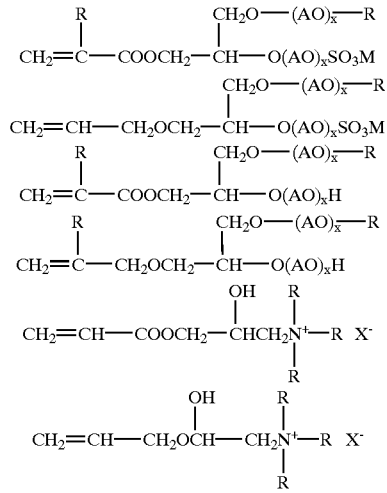

Component (C) can take the form of only a single surfactant or can be a combination of two or more surfactants. Component (C) may be used at from 0.01 to 20 weight parts and preferably at from 0.1 to 10 weight parts, in each case per 100 weight parts of the total amount of components (A) and (B).

The radical polymerization initiator (D) may be selected from the radical polymerization initiators generally used for the emulsion polymerization of vinyl polymers, but its type and nature are not otherwise critical. Component (D) can be exemplified by inorganic persulfates such as potassium persulfate, sodium persulfate, and ammonium persulfate; organoperoxides such as tert-butyl peroxymaleic acid, succinic acid peroxide, and tert-butyl hydroperoxide; water-soluble azo-type radical initiators such as 2,2'-azobis(2-(N-benzylamidino)propane) hydrochloride, 2,2'-azobis(2-(N-2-hydroxyethylamidino)propane) hydrochloride, and 2,2'-azobis(2-methyl-N-hydroxyethyl)propionamide; oil-soluble azo-type radical initiators such as 2,2'-azobisisobutyronitrile, 2,2'-azobis-2,4-dimethylvaleronitrile, 1-azobis-1-cyclohexanecarbonitrile, dimethyl 2,2'-azobisisobutyrate, and 4,4'-azobis-4-cyanovaleric acid; and oil-soluble peroxides such as lauroyl peroxide, benzoyl peroxide, dicumyl peroxide, cyclohexanone peroxide, di-n-propyl peroxydicarbonate, and tert-butyl peroxypivalate. When a water-soluble radical initiator is used in the execution of the present invention, it may be mixed with the other components after their antecedent emulsification. Component (D) may be used at from 0.01 to 20 weight parts and is preferably used at from 0.1 to 10 weight parts, in each case per 100 weight parts of the total amount of components (A) and (B).

The composition of the present invention is obtained by combining from 0.01 to 20 weight parts radically polymerizable surfactant (C) and from 0.01 to 20 weight parts radical polymerization initiator (D) with 100 weight parts of the mixture of vinyl monomer (A) and carbosiloxane dendrimer (B), producing an emulsified dispersion therefrom in an aqueous medium, and effecting emulsion polymerization therein. Components (A) to (D) may be emulsified and dispersed in combination with each other, or the radical polymerization initiator (D) may be added after the antecedent emulsification and dispersion process. The emulsified dispersion can be prepared using the usual emulsification devices, for example, a colloid mill or a homogenizer. Polymerization may be carried out for about 2 to 8 hours after preheating the reaction system to 50 to 90° C. This polymerization can be run by dropwise addition of the emulsified dispersion or after introducing the entire emulsified dispersion in one lot. The former technique is preferred because it facilitates temperature control. A chain transfer agent generally known for use in emulsion polymerizations may also be used in the present invention. The chain transfer agent can be exemplified by mercaptan compounds such as 2-mercaptoethanol, butyl mercaptan, n-dodecyl mercaptan, 3-mercaptopropyltrimethoxysilane, and mercaptopropyl-functional polydimethylsiloxanes; by halogen compounds such as methylene chloride, chloroform, carbon tetrachloride, butyl bromide, and 3-chloropropyltrimethoxysilane; and by alpha-methylstyrene dimer. Surfactant lacking reactive functionality may be used—within a range that does not impair the characteristic features of the inventive composition—in combination with the surfactant (C). The post-polymerization particle size of the emulsion is not critical, but viewed from the standpoints of storage stability and preventing the appearance of aggregates is preferably no greater than 1.0 $\mu$m, more preferably no greater than 0.5 $\mu$m, and most preferably no greater than 0.3 $\mu$m. Please also note that a thickener can be added and/or the specific gravity can be adjusted when the particle size is to be made 1.0 $\mu$m or above. The solids content of the inventive composition is preferably in the range from 15 to 60 weight % based on productivity and handling considerations.

Additives such as colorants, stabilizers, fats, oils, waxes, and fillers can be added to the composition of the present invention as needed. The composition may also contain a curing catalyst for the alkoxysilyl or silanol group within a range that does not impair the composition's stability. This curing catalyst can be exemplified by organometal salts, metal alkoxides, metal chelates, organic amines, and quaternary ammonium salts. The addition of such a curing catalyst functions to improve the adherence to substrate by accelerating the reaction between the composition and the surface of any of various substrates.

A characteristic feature of the inventive composition is the high purity of the silicone-grafted vinyl copolymer post-emulsion polymerization. This occurs due to the high reactivity prevailing between the above-described vinyl monomer and carbosiloxane dendrimer. As a consequence of this elevated purity, films, coatings, and cured products obtained from the composition are highly compatible with other materials, e.g., organic resins, are strongly adherent to various substrates, resist slipping due to their appropriate friction characteristics, and have good printability and writability. In addition, the presence of the dendrimer structure in the surface layer confers an excellent weathering resistance, UV resistance, gloss retention performance, water resistance, resistance to icing, and acid resistance. The use of the radically polymerizable surfactant results in effective water resistance and excellent storage stability. Moreover, the inventive composition, being an aqueous system, is very safe and imposes little load, e.g., atmospheric pollution, on the environment. These features make the inventive composition useful as a main ingredient or additive, for example, for paint resins, waxes, paper processing agents, fiber treatment agents, film processing agents, cosmetics, civil engineering resins, adhesives, and pressure-sensitive adhesives. Films and coatings can be formed from the composition of the present invention by coating the composition on substrate and heating for 5 minutes to 10 hours at 30 to 90° C., or holding at room temperature for 1 hour to 5 days. The film or coating thickness will generally be from 0.1 to 100 $\mu$m.

EXAMPLES

This invention is explained in greater detail below through working examples. Parts in the examples denote weight parts. The following methods were used to measure and evaluate the properties of the emulsion compositions and coatings.

Properties of the Emulsion Compositions
Unpolymerized Fraction (%)

The residual amount of unpolymerized carbosiloxane dendrimer in the emulsion composition was measured and is reported as the weight % calculated on the amount of dendrimer originally added.

Aggregates

The aggregate content in the emulsion composition is reported on a solids basis.

Storage Stability

The emulsion composition was held at quiescence for 3 months at room temperature, after which period the composition was evaluated for the occurrence of aggregation, sedimentation, and separation.

+: no separation or sedimentation was observed

X: separation and/or sedimentation was observed

Properties of the Coatings

Water Repellency

The contact angle of the coating versus water was measured using an automatic contact angle meter from Kyowa Kaimen Kagaku Kabushiki Kaisha.

Water Resistance

The coated test specimen was immersed for 24 hours in ion-exchanged water, and after this period, the coating was evaluated for the occurrence of white haze and delamination. The results of the evaluation are reported on the following scale:

+: no changes were seen

Δ: moderate white hazing occurred

X: white hazing and film delamination occurred

Printability

The surface of the coating was marked with a black ink pen (Magic Ink from Pentel Kabushiki Kaisha) and the extent of ink crawling was then evaluated. The results of the evaluation are reported on the following scale:

+: no abnormalities were seen

Δ: crawling was observed in some regions

X: substantial crawling, marking was difficult

Coefficient of Friction (COF)

The emulsion composition was coated and dried onto the test specimen. The COF was then measured thereon using a thrust friction tester at a peripheral velocity of 10 cm/s and a load of 2 kgf.

Crosshatch Adhesion

Based on the crosshatch test in Section 6.15 of JIS K-5400, 6 longitudinal and 6 transverse cuts were made, in each case on a 2 mm interval, using a cutter knife. Pressure-sensitive adhesive tape was then applied onto the coating and forcefully peeled off and the number of residual squares of the coating was counted.

Staining Resistance

The surface of the coating was marked with a black ink pen (Magic Ink from Pentel Kabushiki Kaisha) and was then air-dried for 10 minutes. The surface was subsequently wiped with defatted cotton that had been impregnated with isopropyl alcohol. The status of the surface of the coating was then visually evaluated and scored on the following scale.

+: absolutely no residues from the markings were observed

X: residues from the markings were observed

Compatibility 10 parts of the emulsion composition were mixed to homogeneity with 90 parts of an acrylic emulsion produced by the radical polymerization of 50 parts methyl methacrylate and 50 parts butyl methacrylate, using 1 part 2,2'-azobisisobutyronitrile. A coating was then formed by drying this mixture and the appearance of the coating was evaluated on the following scale.

+: transparent

Δ: slight turbidity noted

X: white turbidity observed

Example 1

The following were mixed with each other: 10 parts carbosiloxane dendrimer with the structure

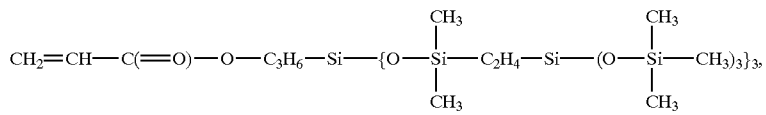

40 parts methyl methacrylate, 40 parts n-butyl methacrylate, 10 parts styrene, 1 part 2,2'-azobisisobutyronitrile, and 0.5 parts n-dodecyl mercaptan. To this mixture was added 3 parts surfactant (Adeka Reasoap NE-20 from Asahi Denka Kogyo Kabushiki Kaisha) with the structure

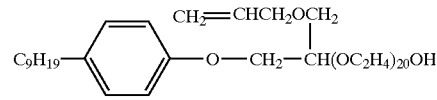

and 100 parts deionized water followed by emulsification and dispersion using a homogenizer. 50 parts deionized water was placed in a separate flask and was held at 80° C. under a nitrogen current. Into this was added dropwise 200 parts of the aforementioned emulsion over a period of 2 hours with stirring. Maturation was continued after the completion of addition for an additional 2 hours at 80° C., resulting in the production of silicone-grafted vinyl copolymer emulsion composition A1. This emulsion composition A1 had an average particle size of 0.15 $\mu$m, contained 40% nonvolatile fraction, and had a molecular weight (as polystyrene) of 50,000. Emulsion composition A1 was coated on a polished soft steel sheet (thickness=0.5 mm) so as to give a post-drying film thickness of 20 $\mu$m, and the coating was then dried for 1 week at room temperature. The properties of emulsion composition A1 and its coating were measured and evaluated, and the results are reported in Table 1.

Example 2

The following were mixed with each other: 20 parts carbosiloxane dendrimer with the structure

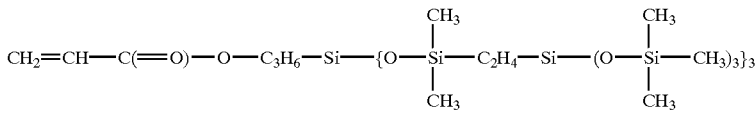

48 parts methyl methacrylate, 32 parts n-butyl acrylate, 0.5 parts dimethyl 2,2'-azobis-2-methylpropionate (V-601 from Wako Pure Chemicals Industries, Ltd.), and 0.5 parts n-dodecyl mercaptan. To this mixture was added 2 parts surfactant (Adeka Reasoap NE-20 from Asahi Denka Kogyo Kabushiki Kaisha) with the structure

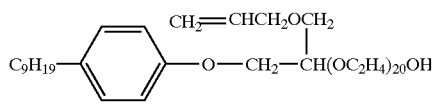

and 100 parts deionized water followed by emulsification and dispersion using a homogenizer. 70 parts deionized water was placed in a separate flask and was held at 80° C. under a nitrogen current; into this was added dropwise 200 parts of the aforementioned emulsion over a period of 2 hours with stirring. Maturation was continued after the completion of addition for an additional 2 hours at 80° C., resulting in the production of silicone-grafted vinyl copolymer emulsion composition A2. This emulsion composition A2 had an average particle size of 0.18 μm, contained 40% nonvolatile fraction, and had a molecular weight (as polystyrene) of 70,000. A coating was formed from emulsion composition A2 as in Example 1. The properties of emulsion composition A2 and its coating were measured and evaluated, and the results are reported in Table 1.

Example 3

The following were mixed with each other: 30 parts carbosiloxane dendrimer with the structure

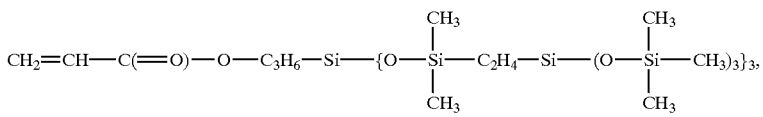

42 parts methyl methacrylate, 28 parts 2-ethylhexyl acrylate, and 0.5 parts n-dodecyl mercaptan. To this mixture was added 5 parts surfactant (Eleminol JS-2 from Sanyo Chemical Industries, Ltd.) with the structure

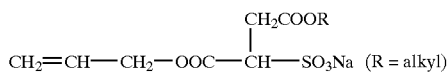

and 100 parts deionized water followed by emulsification and dispersion using a homogenizer. 1 part ammonium persulfate was then added. 100 parts deionized water was placed in a separate flask and was held at 80° C. under a nitrogen current; into this was added dropwise 200 parts of the aforementioned emulsion over a period of 2 hours with stirring. Maturation was continued after the completion of addition for an additional 2 hours at 80° C., resulting in the production of silicone-grafted vinyl copolymer emulsion composition A3. This emulsion composition A3 contained 40% nonvolatile fraction and had a molecular weight (as polystyrene) of 40,000. A coating was formed from emulsion composition A3 as in Example 1. The properties of emulsion composition A3 and its coating were measured and evaluated, and the results are reported in Table 1.

Comparative Example 1

A silicone-grafted vinyl copolymer emulsion composition B1 was prepared using the procedure described in Example 3, but in this case replacing the carbosiloxane dendrimer used in Example 3 with dimethylpolysiloxane with the following structure:

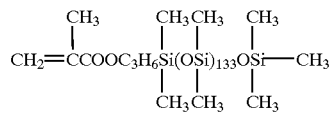

Emulsion composition B1 had a molecular weight of 50,000 (as polystyrene) and contained 40% nonvolatile fraction. A coating was formed from emulsion composition B1 using the procedure described in Example 1. The properties of emulsion composition B1 and its coating were measured and evaluated, and the results are reported in Table 1.

Comparative Example 2

A silicone-grafted vinyl copolymer emulsion composition B2 was prepared using the procedure described in Example 3, but in this case replacing the carbosiloxane dendrimer used in Example 3 with dimethylpolysiloxane with the following structure:

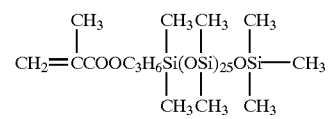

Emulsion composition B2 had a molecular weight of 40,000 (as polystyrene) and contained 42% nonvolatile fraction. A coating was formed from emulsion composition B2 using the procedure described in Example 1. The properties of emulsion composition B2 and its coating were measured and evaluated, and the results are reported in Table 1.

Example 4

A silicone-grafted vinyl copolymer emulsion composition B3 was prepared using the procedure described for Example 3, but in this case using 2 parts sodium lauryl sulfate in place of the surfactant (Eleminol JS-2 from Sanyo Chemical Industries, Ltd.) with the structure

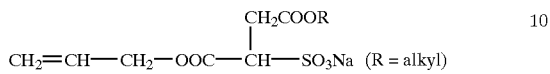

that was used in Example 3. Emulsion composition B3 had a molecular weight of 50,000 (as polystyrene) and contained 42% nonvolatile fraction. A coating was formed from emulsion composition B3 using the procedure described in Example 1. The properties of emulsion composition B3 and its coating were measured and evaluated, and the results are reported in Table 1.

TABLE 1

|  | Example 1 | Example 2 | Example 3 | Comparative Example 1 | Comparative Example 2 | Example 4 |
|---|---|---|---|---|---|---|
| water repellency (contact angle) | 101 | 102 | 102 | 99 | 92 | 78 |
| water resistance | + | + | + | + | Δ | x |
| Compatibility | + | + | + | x | Δ | + |
| Printability | + | + | + | x | Δ | + |
| COF | 0.22 | 0.21 | 0.20 | 0.10 | 0.12 | 0.23 |
| Crosshatch adhesion | 25/25 | 25/25 | 25/25 | 10/25 | 22/25 | 25/25 |
| Unpolymerized fraction (%) | 9 | 7 | 6 | 30 | 21 | 6 |
| particle size ($\mu$m) | 0.15 | 0.18 | 0.19 | 0.78 | 0.40 | 0.15 |
| aggregates (%) | ≦0.1 | ≦0.1 | ≦0.1 | 11.9 | ≦0.1 | ≦0.1 |
| storage stability | + | + | + | x | + | + |
| Staining resistance | + | + | + | x | Δ | + |

Thus, the silicone-grafted vinyl copolymer emulsion composition of this invention is an emulsion composition whose base or principal component is a vinyl copolymer that contains a special carbosiloxane dendrimer structure. The inventive emulsion composition is characterized by an excellent storage stability and by the ability to form a film or coating that exhibits an excellent water repellency, water resistance, printability, adherence, and resistance to staining.

What is claimed is:

1. A silicone-grafted vinyl copolymer emulsion composition produced by the emulsion polymerization of components comprising (A) a vinyl monomer;

(B) a carbosiloxane dendrimer that contains a radically polymerizable organic group of the formula

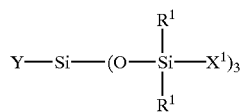

wherein Y is a radically polymerizable organic group, $R^1$ is $C_1$ to $C_{10}$ alkyl or aryl, and $X^1$ is the silylalkyl group with the following formula when i=1:

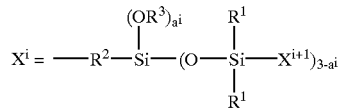

wherein $R^1$ is defined as above; $R^2$ is $C_2$ to $C_{10}$ alkylene; $R^3$ is $C_1$ to $C_{10}$ alkyl; $X^{i+1}$ is selected from the group consisting of hydrogen, $C_1$ to $C_{10}$ alkyl, aryl, and the above-defined silylalkyl group; i is an integer of from 1 to 10 that specifies the generation of said silylalkyl group; and $a^i$ is an integer from 0 to 3, wherein the weight ratio of (A):(B) is from about 0:100 to 99.9:0.1;

(C) a radically polymerizable surfactant, at from 0.01 to 20 weight parts for each 100 weight parts of the total of components (A) and (B); and (D) a radical polymerization initiator, at from 0.01 to 20 weight parts for each 100 weight parts of the total of components (A) and (B).

2. The silicone-grafted vinyl copolymer emulsion composition of claim 1, wherein the radically polymerizable organic group Y is selected from the group set consisting of acryl- and methacryl-functional organic groups of the formulas

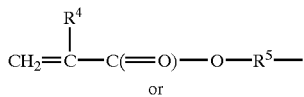

or

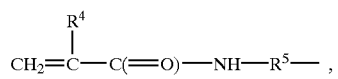

wherein $R^4$ is hydrogen or methyl and $R^5$ is $C_1$ to $C_{10}$ alkylene, styryl-functional organic groups with the general formula

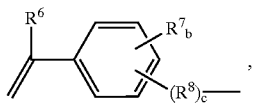

wherein $R^6$ is hydrogen or methyl, $R^7$ is $C_1$ to $C_{10}$ alkyl, $R^8$ is $C_1$ to $C_{10}$ alkylene, b is an integer from 0 to 4, and c is 0 or 1; and $C_2$ to $C_{10}$ alkenyl.

3. The silicone-grafted vinyl copolymer emulsion composition of claim 1, wherein the copolymer has the capacity to form a film or coating.

4. The silicone-grafted vinyl copolymer emulsion composition of claim 1, wherein the copolymer has the capacity to form a film or coating.

* * * * *